PLUG-IN PACKAGES FOR ELECTRONIC CIRCUITS
Filed Aug. 21, 1953 4 Sheets-Sheet 1
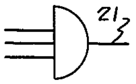
Fig. 1-A
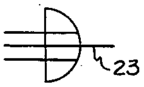
Fig. 1-B
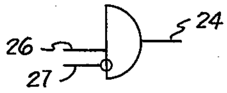
Fig. 1-C
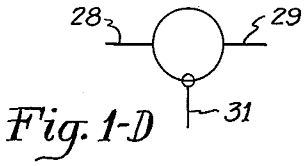
Fig. 1-D
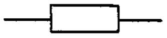
Fig. 1-E
Fig. 1-F
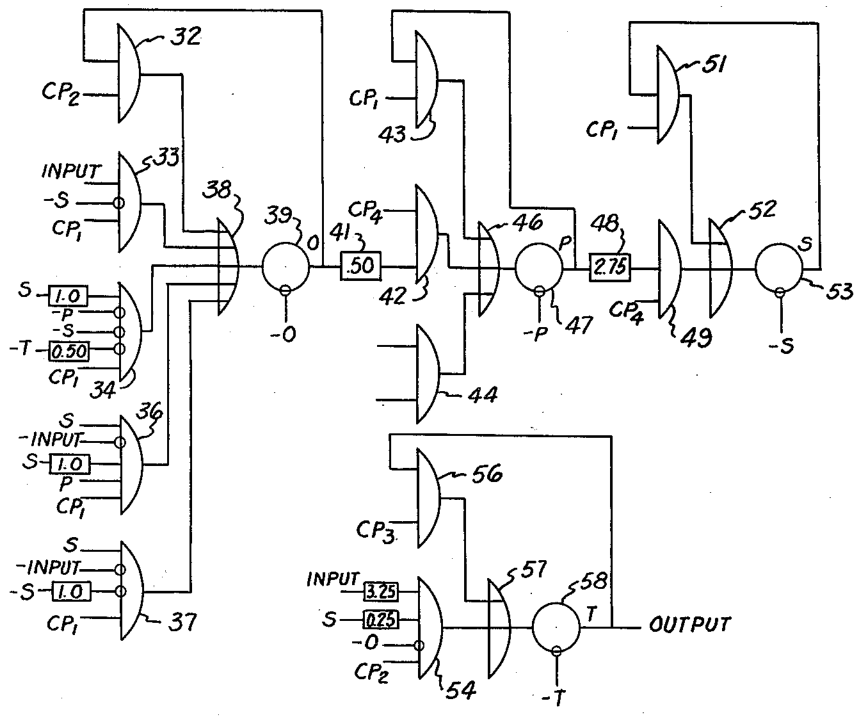
Fig. 2
INVENTOR
Richard P. Witt
BY Howard L. Rose
AGENT

PLUG-IN PACKAGES FOR ELECTRONIC CIRCUITS

Filed Aug. 21, 1953

INVENTOR
Richard P. Witt
BY Howard L. Rose
AGENT

May 22, 1962 R. P. WITT 3,036,222
PLUG-IN PACKAGES FOR ELECTRONIC CIRCUITS
Filed Aug. 21, 1953
4 Sheets-Sheet 3
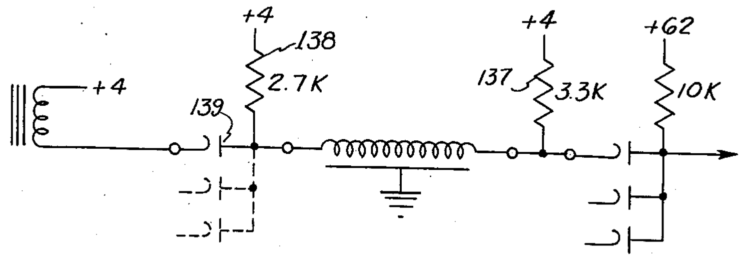
Fig. 5-A
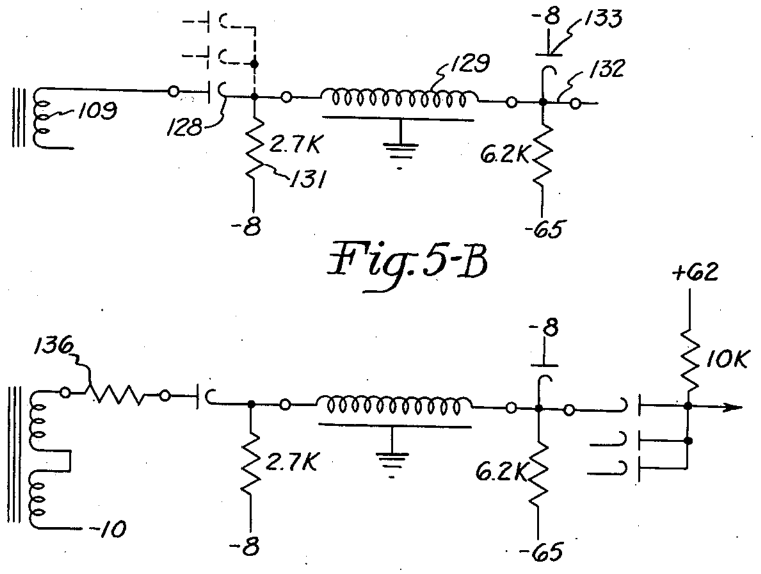
Fig. 5-B, Fig. 5-C
INVENTOR
Richard P. Witt
BY Howard L. Rose
AGENT INVENTOR
Richard P. Witt BY Howard L. Rose

AGENT

United States Patent Office 3,036,222
Patented May 22, 1962

3,036,222

PLUG-IN PACKAGES FOR ELECTRONIC CIRCUITS

Richard P. Witt, Alexandria, Va., assignor to the United States of America as represented by the Secretary of Commerce Filed Aug. 21, 1953, Ser. No. 375,846
1 Claim. (Cl. 307—88.5)
(Granted under Title 35, U.S. Code (1952), sec. 266)

The invention described herein may be manufactured and used by or for the Government of the United States for governmental purposes without the payment to me of any royalty thereon in accordance with the provisions of 35 United States Code (1952), Section 266.

The present invention relates to plug-in packages for use in electronic digital computing machines and in particular to two types of etched circuit plug-in packages from which all of the high-speed arithmetical and control circuitry of the machine can be built up.

The large number of circuit components in the modern digital computer makes it essential to devise rapid methods of servicing the machine. Otherwise too much time would be devoted to maintaining the machine in proper operating condition. In an effort to provide these rapid methods of servicing, the present invention contemplates employing the service technique of package replacement. In this approach to the problem, when an individual unit is found to be malfunctioning it is immediately replaced by a new unit, the old unit being sent elsewhere for servicing. The usual difficulty in this type of approach, particularly in the computing machine field is that the number of different types of units which would normally have to be carried in stock would be very large and therefore would greatly increase the cost of maintaining the machine.

It is the primary object of the present invention to build up all of the high-speed arithmetic and control circuitry of an electronic digital computing machine from just two types of plug-in packages.

Another object of the present invention is to provide compactly packaged plug-in units from which the computer may be built up without sacrificing the desirable features obtained in conventional circuit layouts.

Another object of the present invention is to provide plug-in packages which make it possible to greatly reduce the chassis surface area of the computer by providing three dimensional wiring.

It is another object of the present invention to provide plug-in packages, much of the wiring of which is completed when the package is plugged into the base.

Still another object of the invention is to provide plug-in packages in which one of the packages contains gating and amplifying circuits which can be adapted, by appropriate wiring of the package receptacle, to receive a varying number of inputs.

It is another object of the present invention to provide a tube package which provides electrical units for performing the functions of Boolean "and," "or" and "not" and in which these electrical units are arranged in a pattern which corresponds to one of the normal forms in which every Boolean proposition may be expressed.

It is another object of the present invention to provide a second type of plug-in package which contains delay line units and their corresponding termination means.

Another object of the present invention is to provide a gating package which contains practically all the necessary equipment for gating and amplifying.

Yet another object of the present invention is to provide plug-in packages which by appropriate wiring of the female receptacle can be adapted to perform several hundred various functions in the computer.

It is another object of the present invention to provide plug-in packages which use a very small number of different types of electrical components.

It is another object of the present invention to provide plug-in packages in which it is possible to "borrow" components from several packages to provide for various gating functions which are not normally provided by the tube package.

It is another object of the present invention to provide plug-in packages in which it is possible to "borrow" components from one package for use with the components of another package.

Other uses and advantages of the invention will become apparent upon reference to the specification and drawings.

FIGURES 1A–1F shows the various symbols which will be used throughout the drawings of the specification.

FIGURE 2 is a logical diagram of a minor cycle counter which may be used in a computer.

FIGURES 5A–5C shows various ways in which delay lines may be used.

Figure 3:
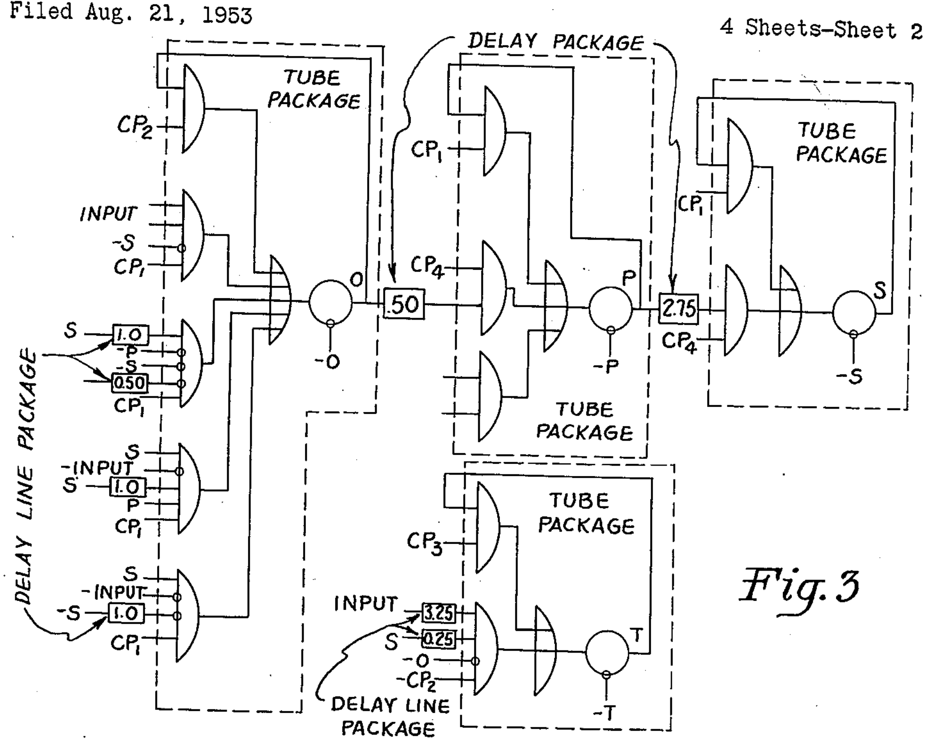
FIGURE 3 is a diagram of the minor cycle counter broken up into various plug-in packages.

Several symbols which will be used throughout the specification are shown in FIGURES 1A–1F. FIGURE 1A is an and-gate which performs the logical "and" function. Therefore a signal will appear on the output lead 21 when, and only when, all of the input leads 22 receive a pulse at the same time.

FIGURE 1B is an or-gate which performs the logical "or" function. Therefore a pulse will appear on the output lead 23 when any one of the input leads is pulsed, and the amplitude of the output pulse is independent of the number of inputs which may be pulsed simultaneously.

The output voltage of an and-gate approximates its *lowest* input voltage; whereas, the output voltage of an or-gate approaches its *highest* input voltage. Therefore, an or-gate performs the logical "or" function because it will transmit a positive pulse applied to any of its input terminals. On the other hand an and-gate performs the logical "and" function because it can transmit a positive pulse only when all of its input terminals are pulsed positively.

FIGURE 1C shows an inhibitor gate which performs the logical "not" function. Therefore a pulse will appear on the output lead 24 when input lead 26 is pulsed but not when input lead 27 is pulsed. Consequently whenever lead 27 is pulsed no output can occur regardless of what is happening on input lead 26. The small circle at the junction of the lead and the symbol for the gate indicate an inhibitor input.

The internal structure of the and-gate and inhibitor-gate is identical, and a gate will be of one or the other type depending upon the polarity or magnitude of the bias voltage supplied to the inputs and the polarity of the pulse supplied.

FIGURE 1D shows a pulse-train amplifier. Signals are fed to the amplifier over lead 28 and pulses are produced on output lead 29. The lead 31 carries an inhibitor pulse which will be fed to an inhibitor lead, such as lead 27 in FIGURE 1C. The designation of the inhibitor output is a small circle at the beginning of the lead.

FIGURE 1E shows a delay line which in the present case is a close-wound helix of very fine wire. The time of delay through the unit is determined by the length of wire. The delay in microseconds is shown by the numeral inclosed in the rectangle.

FIGURE 1F is the symbol used throughout the specification to denote a unilateral conducting device whether it be a crystal diode, an electron tube diode or some other type of unilateral conducting element. The positive terminal is the straight line which is perpendicular to the lead wire.

For a complete description of the and, or, and inhibitor gates see the copending application on "Gate Circuitry," application Serial No. 244,446, filed on August 30, 1951, by Robert D. Elbourn and Ralph J. Slutz, now Patent No. 2,712,065, issued on June 28, 1955. The pulse-train amplifier is described in the above cited application and in application Serial No. 218,865, filed on April 2, 1951, now Patent No. 2,698,883, issued on January 4, 1955, by William L. Martin, and application Serial No. 205,614, filed on January 9, 1951, now Patent No. 2,650,955, issued on September 1, 1953, by William L. Martin, Ralph J. Slutz, and Henry R. Senf. The details of the delay line will be shown and described later in this specification.

The above-described elements constitute the greatest percentage of the required basic components of an electronic digital computer since they can handle all gating, amplification and delay.

An example of how these basic units may be interconnected to provide a useful major component of a computer is shown in FIGURE 2. The minor cycle counter shown in this figure is one of many typical units which will be found in modern electronic computers. This device counts binary input pulses and gives out a pulse whenever a predetermined number of binary pulses has been received. The circuit is comparatively simple when compared with many of the circuits used in electronic computers. However, it serves the purpose in this case of showing how a typical computer subassembly can be built up from the basic components described above.

Referring to FIGURE 2, gate 32 is an and-gate and gates 33, 34, 36, and 37 are inhibitor gates. The outputs of all five of these gates are connected to the inputs of the or-gate 38. The output of the gate 38 is fed to the input of the pulse-train amplifier 39. A first output of the pulse-train amplifier 39 is connected through the half-microsecond delay line 41 to one of the inputs of the and-gate 42, the other input of which is connected to receive the clock pulse $CP_4$.

A continuously repetitive signal referred to as a clock (CP) pulse is always used as one of the inputs to the gates preceding the amplifier input buffer. This clock signal prevents any output from the gates while it is negative. If signals are to exist at a gate, these signals (by circuit design) shall commence before the clock pulse goes positive. These clock pulses exist in variously shifted time phases which will be considered as one-quarter of the basic repetition rate for each separation, and these pulses will be considered to be slightly wider than one-quarter of a pulse period.

Another output of the amplifier 39 is fed directly to one of the inputs of the and-gate 32, which has its other input connected to receive the clock pulse $CP_2$. The inhibiting output —O of amplifier 39 is connected to the inhibiting input of inhibitor gate 54. The outputs of and-gates 42, 43, and 44 are connected to the inputs of the or-gate 46. The output of gate 46 is fed to the input of pulse-train amplifier 47, one output of which is connected to one of the inputs of the and-gate 43, the other input of which is connected to receive clock pulse $CP_1$. Another output P of the amplifier 47 is connected to one input of inhibitor gate 36 and is also connected through the 2.75 microsecond delay line 48 to one of the inputs of the and-gate 49, the other input of which is connected to receive the clock pulse $CP_4$. The inhibitor output —P of amplifier 47 is connected to one inhibitor input of gate 34. The outputs of the and-gates 49 and 51 are connected to the inputs of the or-gate 52, the output of which is fed to the input of the pulse-train amplifier 53. One output of the pulse-train amplifier 53 is fed to one of the inputs of the and-gate 51, the other input of which is connected to receive the clock pulse $CP_1$. Another output S of the amplifier 53 is connected through a one-microsecond delay to one of the inputs of the inhibitor gates 34 and 36 and is also connected directly to one input of each of the gates 36 and 37. This output of amplifier 53 is also connected through a quarter-microsecond delay line to one input of the inhibitor gate 54. The inhibitor output of amplifier 53 is connected to inhibitor inputs of inhibitor gates 33 and 34 and through a one-microsecond delay line to an inhibitor input of gate 37. All of gates 33, 34, 36, and 37 have one input connected to receive clock pulse $CP_1$ and gate 33 is connected to receive the input pulse. Gates 36 and 37 have one input each connected to receive an inhibiting pulse from the input pulse source.

The input pulse is also fed through a 3.25 microsecond delay line to one input of the inhibitor gate 54, another input of which is connected to receive a $CP_2$ pulse. The outputs of gates 54 and 56 are connected to the inputs of or-gate 57, the output of which is connected to the pulse-train amplifier 58. One output of the amplifier 58 is connected to one of the inputs of and-gate 56, the other input of which is connected to receive clock pulse $CP_3$. The other output, T, of the pulse-train amplifier is fed to the computer, this output indicating when a complete count has been made. The inhibitor output —T of amplifier 58 is connected to an inhibitor input of gate 34 through a 0.50 microsecond delay line.

When one of these narrow pulses is gated into the input of the amplifier the output activates another gate that is clocked with the next successive clock pulse which holds an input to the tube for approximately one-half microsecond. This secondary gate is referred to as the "regeneration broadening circuit" and is employed in all stages. For a detailed description of the operation of these circuits see application Serial No. 193,696, filed on November 2, 1950, by Ralph J. Slutz.

Gate 32 is the above-mentioned regeneration circuit and acts to broaden signals that pass through gates 33, 34, 36, and 37. Gate 33 is used to insert the least significant digit into the counter when there is no signal existent in that numerical position. This signal will pass through gate 42, be regenerated by gate 43, and then be acted on by gates 51 and 52 to generate signal S, four time periods after the input. A new input may occur four, or any integer multiple of four, time periods later. In the absence of more inputs the count is stored by re-entry through gates 36 or 37. A second input pulse is prevented from entering gate 33 by the simultaneous presence of —S which is stored from the first input. Likewise, the —input prevents the stored pulse from passing through gates 36 and 37. Because of the elimination of this first pulse, gate 34 inserts a pulse in the next time position (which position corresponds to a binary count of two). This pulse will be stored now by recirculation through gates 36 and 37. The next input pulse may pass through gate 33 because it will occur non-coincidentally with the stored pulse. This third pulse does not affect the stored two count and a net binary count of three is attained. By this procedure, counting continues until all time positions contain pulses. This will be after 15 successive inputs. With all successive pulse positions activated, the circuit should respond to the next input by clearing out all pulse positions and furnish a pulse at stage T. Gate 34 generates the carry pulses as explained previously. On the 16th input it would insert an erroneous carry into the units position except for the presence of a pulse on the —T input which corrects this action. Gate 44 may be used to insert pulses into the counter so that it starts counting at some number other than zero. As an example, if it has inputs of T delayed 1.25 and 2.25 time intervals, the counter will start counting with the binary 6 and will produce a pulse at T for every 10 inputs.

The foregoing description has shown how the major assemblies of the computer may be built up from certain basic components; namely, and-gates, or-gates, inhibitor gates, amplifiers and delay lines. In the usual chassis-type assembly the various individual resistors, diodes, delay lines, tubes, etc. would be mounted on a chassis and the chassis would be wired. Then if any single unit failed, the various components would have to be checked to locate the faulty elements, this element would have to be unsoldered and a new element soldered in its place. To avoid this, many designers of computers are resorting to plug-in packages so that when a package is found to be malfunctioning it may be replaced immediately by a good unit. In order to eliminate the necessity for carrying a large number of different types of packages in stock the designer attempts to determine how the circuitry may be broken down into the least number of different types of packages. It was found that this result could best be achieved by initially dividing the circuitry into delay-line packages and tube and gate packages, hereafter called a tube package Each delay-line package would carry various lengths of lines and suitable input and termination means for each length. A good arrangement for delay lines was found to include twelve 0.25 microsecond dealy lines and one 0.75 microsecond delay line per package. This provides a total delay in each package of 3.75 microseconds. In addition to the delay lines and termination means, extra diodes are provided which may be combined with unused termination circuits to provide for various gating functions which may be supplemental to those performed by the tube packages. This will be described in greater detail further on in the specification.

After an analysis of the other circuitry of the computer it was determined that a very versatile tube package could be obtained by including in each package a group of components which would preform the functions corresponding to the Boolean "and," "or" and "not" which are a complete set of connections in Boolean algebra. Also it was decided that each package should have several end-gates and/or inhibitor gates, feeding one or-gate, since this configuration corresponds to one of the normal forms in which every Boolean proposition can be stated. It was found that if each tube package contained five and-gates, an or-gate, and a pulse-train amplifier, it would be possible to build up all of the control and arithmetic circuitry, delay lines excluded, by using only one type of plug-in package.

Applying this procedure to the circuitry of the minor cycle counter shown in FIGURE 2, the arrangement of FIGURE 3 is obtained. The and-gates 32, 33, 34, 36, and, 37, or-gate 38 and pulse-train amplifier 39 are included in a first package. The and-gates 42, 43, and 44, or-gate 46 and pulse-train amplifier 47 are included in a second package. The and-gates 49 and 51, or-gate 52 and pulse-train amplifier 53 are included in a third package and and-gates 54 and 56, or-gate 57 and pulse-train amplifier 58 are included in a fourth package.

The delay lines associated with gates 34, 36, and 37 are included in a first delay-line package, those associated with the gate 54 are included in a second package, and the remaining lines are included in a third package.

Therefore the minor cycle counter can be built up of four identical tube packages and three identical delay-line packages. It will be noted, however, that the circuit uses only two of the and-gates in the third and fourth packages and only three of the and-gates in the second tube package, while all five and-gates are used in the first tube package. As a result of this it was found desirable not to connect the outputs of each and-gate to the inputs of the or-gate within the package but to provide the necessary connections for the particular package in the female receptacle which receives the plug-in package. It was found that other connections of the internal components could best be made in the female receptacle and these will be set out in more detail later.

Figure 4:
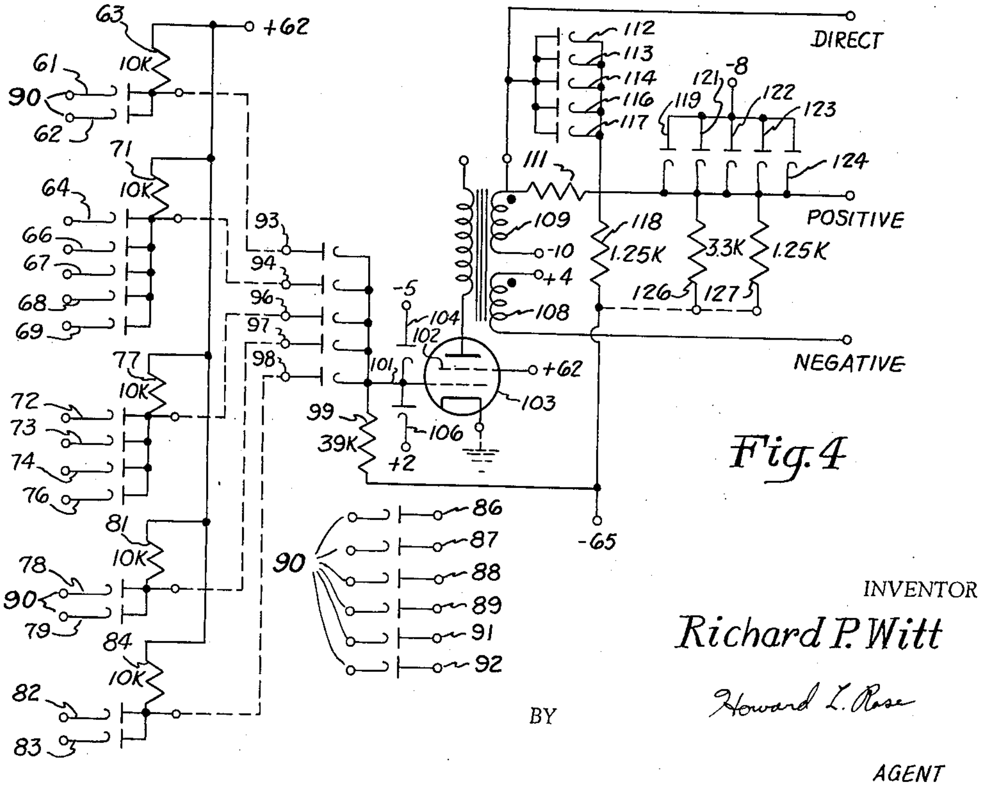
FIGURE 4 is a circuit diagram of the internal circuitry of a tube package.

The internal circuitry of each tube package is shown in FIGURE 4. The diodes 61 and 62 have their positive terminals connected together and to one end of the 10K resistor 63 to form a two-input and-gate. The diodes 64, 66, 67, 68 and 69 have their positive terminals connected together and to one end of the 10K resistor 71. Diodes 72, 73, 74, and 76 are similarly connected to the 10K resistor 77 to form a four-input and-gate, and diodes 78 and 79 and resistor 81 and diodes 82 and 83 and resistor 84 are connected in the same way to form two two-input and-gates. The other terminal of the resistors 63, 71, 77, 81 and 84 are connected to one lead which is connected to one of the package's output terminals. The output terminals for each lead are actually the various pins of a male plug which is an integral part of the physical structure of the packages. When the pins of the package are plugged into the proper female receptacle the lead under consideration is connected to a source of +62 volts. The referred-to pins and receptacles can be in the form of any well-known electrical connecting device. A convenient plug and receptacle which may be employed for such purpose is shown and described on page N11 of Radio's Master Official Manual and Buying Guide of Electronic and Radio Equipment, published by United Catalog Publishers Inc., 10th Edition, 1943, and identified as catalog numbers P315 58 and S315 58, respectively. The negative terminals of each of the aforesaid diodes are connected to an appropriate source of pulses also when the package is plugged in. These pulses may be derived from outside sources or may be derived from other components of the same package through wiring in the female receptacle. It will be noted that the package as initially set up provides three two-input, one four-input, and one five-input and-gates. Referring to FIGURE 3, it is seen that the circuit of the first package requires one two-, one three-, one four-, and two five-input and-gates. Therefore to provide the degree of flexibility needed in a computer, six spare diodes, 86, 87, 88, 89, 91, and 92 are provided, these diodes being unconnected initially, each diode having both of its terminals connected to output terminals of the package; that is, the pins in the male plug of the above identified type of the package. By appropriate wiring in the female receptacle of the type above described the package is adapted to the circuit of FIGURE 3 when the package is plugged in. Thus the positive terminals of diodes 86, 87, and 88 will be connected to the positive terminals of diodes 78 and 79 to provide the second five-input gate, and diode 89 will be connected to the positive terminals of diodes 82 and 83 to provide the three-input and-gate. Whether or not a gate will operate as an and-gate or inhibitor gate is determined by proper choice of signal sources. The occasion may arise where more inputs to the and-gates are needed than can be provided by the spare diodes in that particular package. However, by appropriate wiring between the female receptacles into which the packages are plugged, the spare diodes in other packages can be borrowed and made available where needed. This borrowing is automatically accomplished when the package is plugged in, since the female receptacles are already wired to accomplish this. The major limiting factor on the borrowing of units is the allowable stray capacitance as a function of the current available in the gating resistors.

The or-gate 38 of FIGURE 2 is made up of five diodes, 93, 94, 96, 97, and 98, which have their negative terminals connected to one end of the 39K resistor 99. The other terminal of the resistor 99 is connected to a −65 volt source when the package is plugged in. The output of the or-gate is connected over the lead 101 to the grid 102 of the tube 103. The tube is a 6AN 5, the same tube being used in all packages. The lead 101 is also connected to the negative terminal of diode 104 and the positive terminal of the diode 106. The other terminals of these diodes are connected to the indicated voltages when the package is plugged in. The cathode and screen grid of tube 103 are also connected at this time to the appropriate voltages. The plate of tube 103 is connected through the primary of the transformer 107 to a terminal of the package, which will supply 235 volts when in operation. The secondary 108 of the transformer 107 is usually used to supply the inhibitor output, but since it has no internal connections it may be used for other purposes as will be explained later. The secondary 109 has one terminal brought out to a base pin, and the other terminal is connected to the 130-ohm resistor 111 and to the positive terminals of diodes 112, 113, 114, 116, and 117. The other end of the resistor 111 is connected to the negative terminal of these diodes, to one end of the 1.25K resistor 118, and to the negative terminals of the diodes 119, and 121—124. The positive terminals of these diodes are connected to a common base pin of the package. The other end of the resistor 118 is connected to a common terminal with the resistor 99. By appropriate wiring in the female receptacle the resistor 126 and 127 may be shunted across resistor 118.

Although a complete description of the operation of the various components of this circuit may be found in the afore-mentioned copending applications a brief description of the circuits is presented below.

In the normal or quiescent condition of no pulses, the diodes of the and-gates are conducting because their input terminals are held at slightly below −8 volts by being connected to the positive output terminals of preceding packages. Each positive output terminal is held just below −8 volts by its −8 volt limiting diodes which are kept conducting by the pull-down resistor 118, which is returned to −65 volts. With the output terminals of the and-gates at about −8 volts, the diodes in the or-gate are nonconducting because the limiting diode 104 prevents the 39K resistor 99 from pulling the grid down much below −5 volts. The approximate 3-volt back bias on the or-gate diodes protects the grid 102 from noise such as cross-talk on long leads between packages or variations in forward drop across the −8 volt limiting diodes.

A diode and-gate imposes quite unusual requirements upon the sources which drive it. When a source pulses positively, its diode simply cuts off so that practically no current flows, but when a source is *not* pulsing, it must actively exert its veto power by drawing through its gate diode whatever current is necessary to hold the potential of the gate down to about −8 volts. Only when *all* the inputs to a gate go positive simultaneously should the 10K resistor be permitted to pull up the output voltage of the gate and, through conduction of the or-gate, to transmit a positive pulse to the grid 102. Whenever some, but not all of the inputs to an and-gate are pulsed the remaining inputs must be maintained negative. This is accomplished by the pull-down resistor 118 which is returned to −65 volts. This resistor therefore insures that the output to which it is connected will remain negative when unpulsed, regardless of the effect of the other inputs to the and-gate on the 10K pull-up resistor. This, however, requires that the remaining unpulsed inputs must suddenly accept with little change in voltage a different proportion of the current supplied by the 10K resistor; therefore, a low dynamic impedance is required. By themselves a tube and transformer are not a suitable source, because when not pulsed they may present as much as 300 ohms impedance at one megacycle. The required low dynamic impedance is achieved by the forward conductance of the −8 volt limiting diodes 119, 121, 122, 123, and 124. To keep them conducting, even when all other sources pulse, the pull-down resistor 118 must draw more current than can be supplied by the 10K resistors in all the and-gates connected to the positive output. Therefore the resistor performs the two functions of maintaining its output lead negative and thereby also keeping the diodes conducting so that the diodes may provide the required low dynamic impedance. Because the positive pulse secondary of the transformer returns to −10 volts, the series diodes 112, 113, 114, 116, and 117, which constitute an or-gate, are cut off so that none of this current is trapped in the high dynamic impedance of the transformer. When the tube is turned on, a 20-volt pulse appears at the transformer's secondary, the series diodes conduct, and the transformer supplies the current taken by the resistors connected to −65 volts. Three resistors are provided to permit the load on the positive output to be adjusted to the number of and-gates actually to be driven. Each 1.25 resistor can hold down five gates and the 3.3K resistor can hold down two. The rest of the package's rated driving capacity of 14.5 gates can be used at the negative and the direct outputs. One of the 1.25K resistors is permanently connected to insure that there will be at least enough load to prevent excessive screen dissipation. The other resistors 126 and 127 may be connected by suitable wiring in the female receptacle. The 130-ohm resistor which shunts the series diodes adds no load during a pulse but it provides somewhat less than critical damping for the negative-going transient which follows a pulse. The combination of the 130-ohm damping resistor and the permanently connected 1.25K resistor is sufficient to prevent the underdamped transient from going above −8 volts.

The function of inhibiting a gate is accomplished by connecting the negative output of transformer 107 directly to an input diode of the and-gate. Because the secondary winding 108 is normally returned to +4 volts, this diode is normally nonconducting and does not affect the operation of the gate. But whenever a negative pulse is applied to this diode it becomes the most negative input to the gate and by conducting prevents any positive output at that pulse time. An inhibiting connection does not require an or-gate because it carries current only during a pulse at which time the tube and transformer present a very low impedance.

The winding 108 may be connected in series with the winding 109 in which case the lower terminal of winding 108 is returned to −10 volts. This connection, which provides twice the normal output voltage, is used when it is necessary to supply a long delay line in which the transmitted pulse will be greatly attenuated. The connection of all terminals of the secondaries except the upper terminal of winding 109 is made in the female receptacle. It will be noted that the amplifier has a third output marked "direct." This output is used to drive or-gate or delay lines since in these cases there is no need to provide the resistor 118 which, as pointed out above, is used primarily for holding the positive output negative when unpulsed.

The tube package described above may be used throughout the computer. All diodes shown are identical and are the same in each package. All tubes and transformers are the same from package to package and so are the resistors. Therefore each package and therefore all gating and amplifying functions in the machine are performed by only seven different elements; namely, the diodes, the 6AN5 tubes, the transformers, 39K, 3.3K, 10K ond 1.25K resistors. As a result of this standardization the maintenance crew is able to become completely familiar with the inherent characteristics of each of the seven elements in use and therefore can maintain the machine with a minimum of time lost due to unfamiliarity with a large number of different components.

Pulses are standardized in shape and timing, and the entire computer is kept in synchronism by making a clock pulse one input to every gate. Actually the clock pulses are distributed as one-megacycle sine waves at 30 to 45 volts peak-to-peak amplitude. However, the effective waveform is just the trapezoidal center slice which lies between the −5 and +2 volt grid clipping levels. The delay through a tube and transformer is much less than one microsecond; in fact, the best timing tolerances are obtained when the clock pulses in successive stages are separated by about one-quarter microsecond; therefore, four phases of one-megacycle sine waves are used for clock pulses.

An electrical delay line is used to enable a transformer to drive a gate which is clocked by a later phase than the next; therefore, only integral multiples of 0.25 microsecond delay lines are required. The problem of reflections from the nonlinear gate loads can be avoided if the characteristic impedance of the line is made equal to the pulse voltage divided by the current drawn at the top of a pulse; thus the line is matched for the main body of a pulse so that only narrow reflections occur during the rise and fall. These are reduced to negligible size by dispersion in transmission and by partial absorption in an input termination.

A delay line package contains one 0.75 microsecond section and twelve 0.25 microsecond sections along with terminating circuits for five positive pulse lines and for two negative pulse lines. Sections may be connected in series at the female receptacle to obtain other lengths.

FIGURE 5 shows the termination circuits connected between a transformer and the line at the input end and between the line and and-gate at the output.

FIGURE 5A shows the circuits used for a short delay line for positive pulses. The output of the transformer secondary 109 is connected through the diode 128 to the delay line section or sections 129. The junction of the diode and delay line is connected through the 2.7K resistor 131 to one terminal of the package. The other end of the line 129 is connected to an output terminal over lead 132. This lead is connected through the resistor 134 to another terminal of the package which is supplied from a −65 volt source. The lead 132 is also connected through to diode 133 to a pin terminal of the package which is adapted to be supplied from a −8 volt source. The diode 128 is a disconnect diode and serves to disconnect the delay line from the transformer secondary after the pulse terminates. This prevents the back voltage in the secondary from passing into the delay line. The spare diodes, which are shown dotted, may be connected as shown to form an or-gate for use for feeding several signals to the delay line.

The very low dynamic impedance, which an and-gate requires of its positive pulse sources, is supplied by the −8 volt limiting diode 133 and the 6.2K pull-down resistor 134, which is returned to −65 volts. At the top of a pulse the current in the incident wave approximately equals the current taken by the 6.2K resistor.

A long delay line for positive pulses is shown in FIGURE 5B. Since the attenuation of the pulse in a long delay line may be great enough to cause loss of the pulse to the computer, it is necessary when driving such lines to provide extra input voltage. This is accomplished by connecting both secondaries of the transformer in series. This voltage may be in excess of what a given long line requires and therefore the resistor may be connected in the line. This connection is accomplished through the female receptacle when necessary. The input and termination means are the same as for the short line for positive pulses.

FIGURE 5C shows a delay line for negative pulses. The output of a negative pulse line can drive an and-gate directly but the 10K resistor in the and-gate does not take the full pulse current so a 3.3K resistor 137 is added to take up the difference. The 2.7K resistors 138 in the input terminations absorb enough energy from the small returning reflections to prevent their accumulating seriously in the line, but they do not require as much initial pulse current as would terminations equal to the characteristic impedance of the line. The input diode 139 disconnects the line from the back-swing transient of the transformer.

It will be noted that no internal connections between delay lines or between delay line and the input and termination means are made internally. This alllows the package to be set up, by appropriate wiring in the female receptacle, to provide any configuration of delay line lengths, negative or positive lines and input and termination circuits, that is desired.

Figure 6:
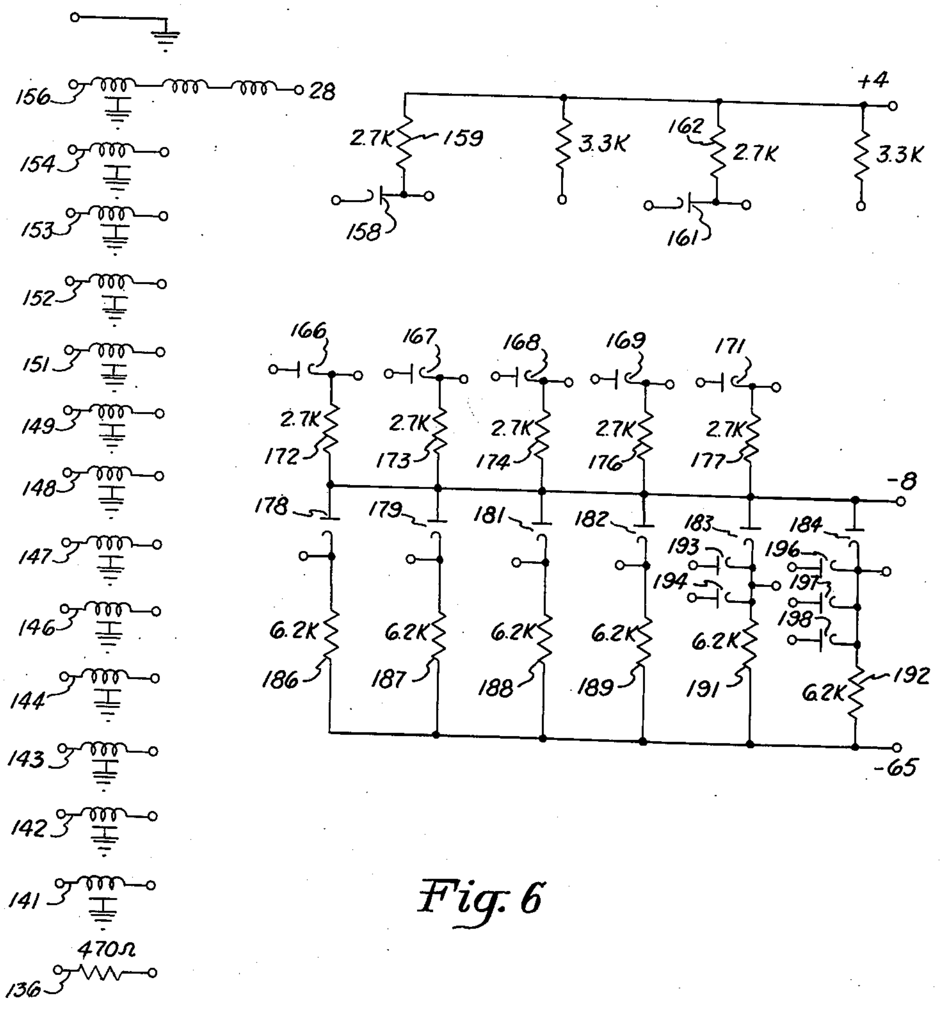
FIGURE 6 is a circuit diagram of the internal circuitry of a typical delay line package.

FIGURE 6 is a diagram of the components of the delay-line package. As previously pointed out, the delay-line package contains twelve 0.25 microsecond delay lines 141–144, 146–149, and 151–154, and a 0.75 microsecond delay line 156. All of these lines and the 470 ohm resistor 157 have both terminals connected to base pins of the package and therefore any connection of these elements must be made in the female receptacle. Also included in the package are the diode-148—resistor-159 and diode-161—resistor-162 combinations which are used as inputs to negative delay lines. These elements are internally connected but are not connected in the package to any particular section of delay line. These connections and the connections to a pulse source are made in the female receptacle. The resistors 163 and 164 are also connected internally to the +4 bus and provide the termination for the negative delay lines. Therefore the package provides input and output terminations for two negative lines. The diodes 166, 167, 168, 169 and 171 have their negative terminals connected to the 2.7K resistors 172, 173, 174, 176, and 177 respectively. The other terminals of the resistors are connected to the −8 volt bus and this combination provides five input circuits to short positive lines. All connections to the lines and to the output terminations are made in the female receptacle. Also if more than one input is fed to a single line the extra input diodes can be obtained from the spare diodes in the tube package by appropriate connections in the female receptacles. The output termination means for positive delay lines are provided by the diodes 178, 179, 181, 182, 183, and 184 and the 6.2K resistors 186, 187, 188, 189, 191, and 192, one end of the resistors being connected to the −65 volt bus and the other end being connected to the negative terminal of its associated diode. The opposite terminal of each diode is connected to the −8 volt bus. These diodes and resistors provide the necessary termination circuits for the positive lines and are connected to the appropriate lines and output utilization devices through the female receptacle.

In many instances it will not be necessary to use all of these termination means and in such cases the 6.2K resistors not so used become available for other uses. As pointed out above, these resistors are used to terminate positive lines which feed and-gates the resistors being used as pull-down resistors and the diodes providing the necessary low impedance output. Therefore, these resistors may be used as pull-down resistors in or-gates when not used as termination resistors for delay lines. To provide for this function the resistor 191 has connected to it the negative terminals of the diodes 193 and 194 and the resistor 192 has connected to it the negative terminals of the diodes 196, 197, and 198. These spare or-gates provide for certain computer gating functions which are not provided for in the tube packages. An example of the use of such or-gates is where it is desired to pass a particular pulse to a section of the computer at predetermined regular intervals. Say, for instance, that it is desired to pass a particular pulse at times $CP_2$ and $CP_4$. The $CP_2$ and $CP_4$ pulses would be fed to an or-gate and the output of the or-gate would be connected as one input to an and-gate. The other input to the and-gate would be the pulse to be gated. With this arrangement the one input to the and-gate would be pulsed only during the $CP_2$ and $CP_4$ pulse times, and therefore the and-gate can pass the other pulse only at those times. If a multi-input or-gate is required, spare diodes may be borrowed from the tube package from which the and-gate is also obtained. In this type of case one sees a tube package being used for its normal function, the delay package being used for its normal function, and elements borrowed from both types of packages being used together for a completely independent function.

The particular arrangement of internal and external connections shown in FIGURES 4 and 6 were found to be most suitable for the computer in which the packages are to be used. However, many factors must be considered when it is to be determined just which connections should be made in the package itself. The highest degree of flexibility can be obtained by making all connections in the female receptacle. However, such a procedure would require a very large base plug which could accommodate a vast number of pin connections. Also serious trouble might develop because of interlead capacitance. Therefore any final design must be a compromise between complete flexibility on the one hand and ease of design on the other hand. However, the important concept in this invention is not where the connections are made but how the various components may be grouped into standardized packages to provide the least number of different types of packages giving a very high degree of flexibility. As previously pointed out the present invention has provided two different types of packages from which all of the computer control and arithmetic circuitry may be built. In some installations where the operators may be willing to carry more than two types of packages a reference to FIGURE 3 shows that it may be well to supply tube packages having only two or three and-gates in addition to those having five and-gates. Such an arrangement would increase the number of various packages which would have to be carried in stock but at the same time many less diodes would have to be used. However, regardless of which scheme is used, it is apparent that only a very few different types of packages are required as a result of the arrangement of components which permits each tube package to perform the logical function of Boolean "and," "or," and "not" (inhibition). It should also be noted that even if packages having only two or three and-gates are used a package having more and-gates can also be inserted at that location since the base wiring will adapt it to the necessary configuration.

In the machine in which these units are being used the tube packages are performing over 250 different circuit functions and any tube package will accept this function since it becomes properly wired both with respect to external units and its own internal components when it is plugged in. The number of different types of elements used has been reduced to a bare minimum, thereby making it possible for inexperienced personnel to become thoroughly familiar with all of the components in a very short time.

It will be apparent that the embodiments shown are only exemplary and that various modifications can be made in construction and arrangement within the scope of my invention as defined in the appended claim.

What is claimed is:

A circuit construction for electronic digital computers comprising: a plurality of identical plug-in circuit packages each of said packages comprising a plurality of and-gates, an or-gate and a pulse amplifier for combining digital information signals in accordance with Boolean logic, each of said and-gates comprising a separate diode corresponding to each input signal applied to an and-gate, each of said and-gates having an optimum number of diodes varying from two to five, said or-gate having a diode corresponding to each and-gate, said package including an input connector terminal connected to one electrode of each diode in said and-gates and said or-gate, means connecting the other electrodes of said and-gate diodes in common internally of said package to a power source connecting terminal, said package further comprising a separate connector terminal connected to the output of each of said and-gates respectively, the other electrodes of said or-gate diodes being connected internally of said package to said pulse amplifier, output connector terminals connected internally of said package to different portions of said pulse amplifier to provide selective outputs of different respective polarities, separate diode means in each of said packages, separate connector terminals connected to each electrode of said separate diode means, receptacle means external to said packages corresponding to each of said package connector terminals for receiving said package terminals, and conductor means selectively interconnecting said receptacle means for integrating the components in each of said packages into a desired circuit configuration, said conductor means connecting any one or more of said and-gate output connector terminals in any selected package to said or-gate input connector terminals, said connector means further providing connections for coupling connector terminals of one or more of said separate diode means to selected ones of said and-gates to supplement the number of diodes in said selected and-gates and for connecting unused and-gates and diodes in any package in a circuit involving the components of any other package.

References Cited in the file of this patent

UNITED STATES PATENTS

| | | |
|---|---|---|
| 1,662,548 | Van Deventer | Mar. 13, 1928 |
| 2,712,065 | Elbourn | June 28, 1955 |

OTHER REFERENCES

A Packaged Angular Position Encoder, H. G. Follingstad, The Transistor, Bell Telephone Laboratories, received in U.S. Patent Office, February 1, 1952; pages 584–609 only.

Review of Electronic Digital Computers, Joint AIEE–IRE Computer Conference, February 1952, pp. 77–78, 105–108, 33 only.

Proceedings of the Association for Computing Machinery, Pittsburgh, Pa., May 2 and 3, 1952, pp. 43–45, 251–257 only.

Review of Electronic Digital Computer, Joint AIEE–IRE Computer Conference, February 1952, p. 47.

Reference Material on Electronic Digital Computers, U.S. National Bureau of Standards, May 6, 1952, Figure G–1.1 for Static Maximum Package relied on.